M. C. BURCH.
COTTON CHOPPER OR CULTIVATOR.
APPLICATION FILED SEPT. 22, 1909.

955,756.

Patented Apr. 19, 1910.
2 SHEETS—SHEET 1.

Witnesses
Frank B. Hoffman
C. C. Hines

Inventor
Marius C. Burch
By Victor J. Evans
Attorney

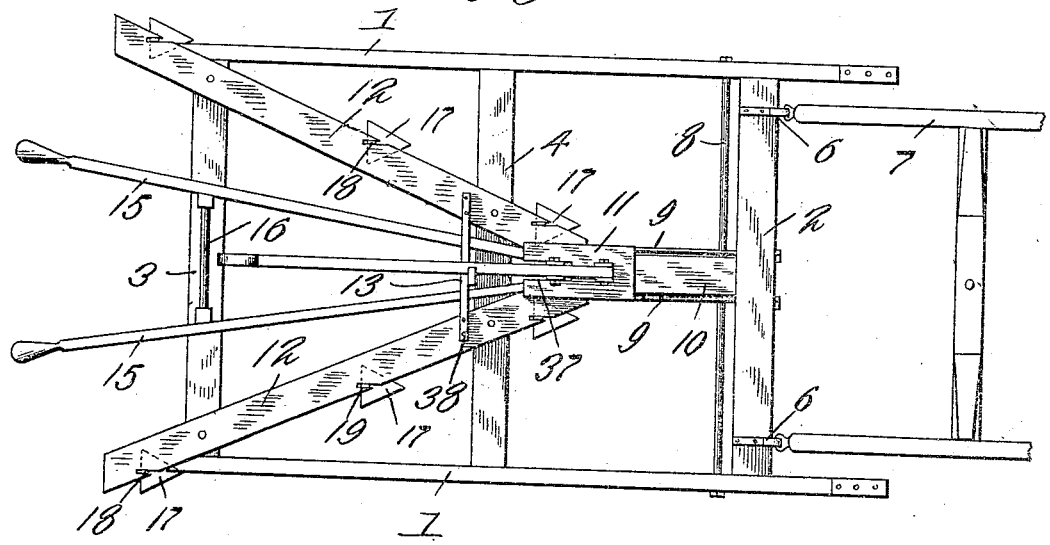
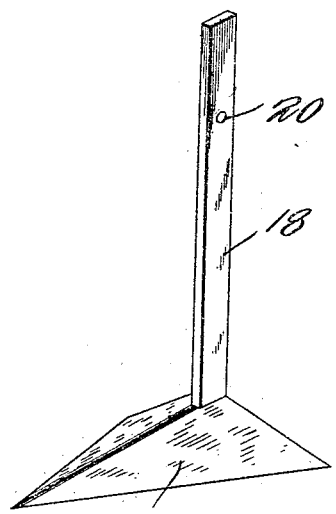
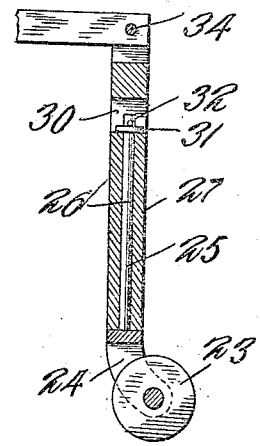

UNITED STATES PATENT OFFICE.

MARIUS C. BURCH, OF NEW DECATUR, ALABAMA.

COTTON CHOPPER OR CULTIVATOR.

955,756.  Specification of Letters Patent.  Patented Apr. 19, 1910.

Application filed September 22, 1909. Serial No. 519,002.

*To all whom it may concern:*

Be it known that I, MARIUS C. BURCH, a citizen of the United States, residing at New Decatur, in the county of Morgan and State of Alabama, have invented new and useful Improvements in Cotton Choppers or Cultivators, of which the following is a specification.

This invention relates to cotton choppers and cultivators, the object of the invention being to provide a simple, inexpensive and efficient type of implement adapted to operate crosswise instead of longitudinally of the rows, which will serve to properly thin the cotton and cultivate the standing plants, which embodies means for preventing injury to the thinning and cultivating hoes, and which is provided with means to enable it to be conveniently manipulated in turning at the ends of rows.

The invention consists of the features of construction, combination and arrangement of parts hereinafter fully described and claimed, reference being had to the accompanying drawings, in which:—

Figure 1:
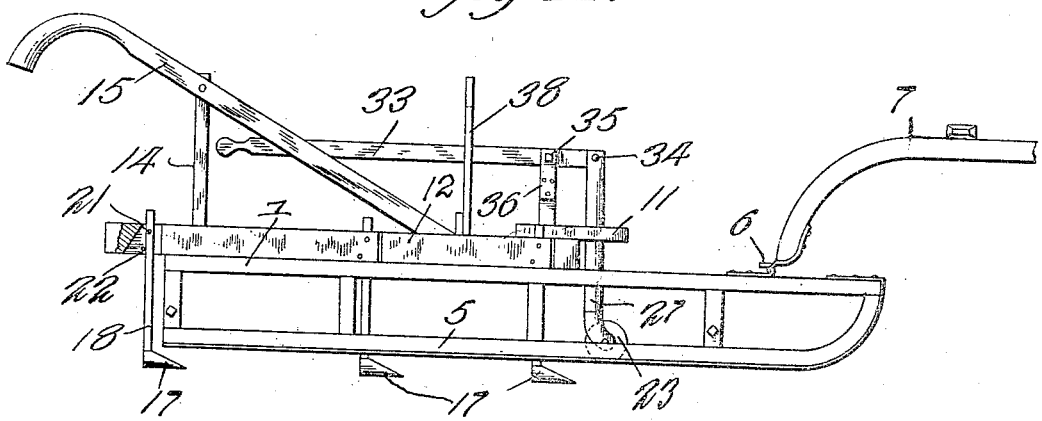
Figure 2:
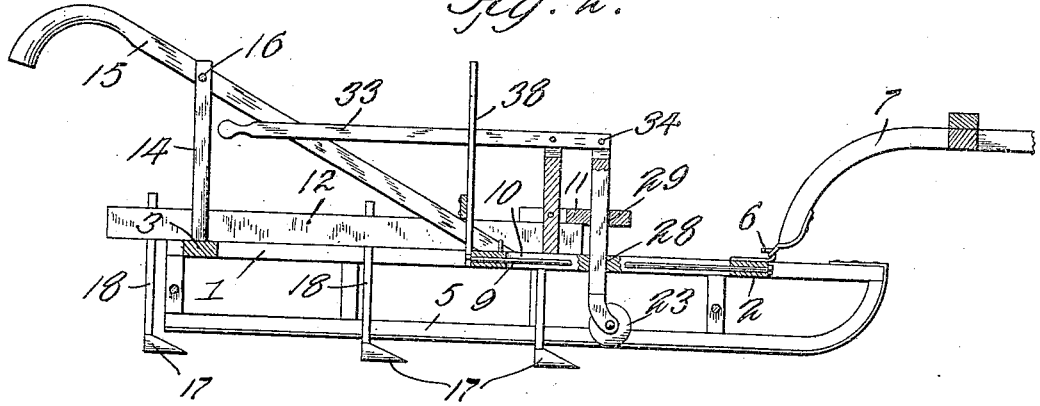

Figure 1 is a side elevation of a cotton chopper and cultivator embodying my invention. Fig. 2 is a central vertical longitudinal section thereof. Fig. 3 is a top plan view of the implement. Fig. 4 is a vertical section through the ground roller. Fig. 5 is a perspective view of one of the shovels.

The frame of the implement is preferably oblong rectangular in form and comprises a pair of longitudinal side bars 1 connected by front, rear and intermediate cross bars 2, 3 and 4, suitable runners 5 being arranged below and connected with the side bars on which the frame is adapted to slide across the surface of the ground. The side bars are provided adjacent their forward ends with suitable draft irons 6 for the attachment of shafts 7, a swingletree or any other suitable form of draft device.

The bars 1 are connected adjacent the bar 2 by a tie rod or bolt 8, while the bars 2 and 4 are connected by a pair of spaced longitudinal tie rods or bolts 9 to further strengthen and stay the parts of the frame structure. Secured to the bars 2 and 4 and extending between the bolts 9 is a short longitudinal supporting bar 10 above the rear portion of which is arranged a horizontal bracket plate 11.

The rear portion of the bracket plate 11 is secured to the adjacent forward or converging ends of a pair of rearwardly diverging supporting beams 12 extending diagonally with relation to the central longitudinal line or line of draft of the machine. These beams 12 are suitably fastened to the bars 3 and 4 and are connected and reinforced by a transverse brace 13. Secured at their forward ends to the bar 4 or bar 10 and at their rear ends to standards 14 rising from the bar 3 are stilts or handles 15, the rear ends of which converge beyond the rear of the frame to enable them to be conveniently grasped by the operator walking behind the implement. The standards are preferably connected and reinforced by a rod or brace member 16.

Each beam 12 carries a series of chopping or thinning and cultivating hoes 17, which are of proper form to cut out the excess plants and throw the soil about the remaining plants. Each of these hoes is carried by a shank or standard 18 which extends vertically through a notch 19 formed in the outer edge of its carrying beam 12. The respective notches 19 extend in a direction parallel with the central line of the frame and open at their forward edges through the outer edges of the beams for the convenient insertion and removal of the hoe shanks as occasion requires, each of the notches being downwardly and rearwardly flared and having an inclined rear wall, as shown in Fig. 1. Each hoe shank is provided with a perforation 20 for the passage of a pin or bolt 21 by which said shank is pivotally mounted within its notch and rests at its rear edge below said bolt against a cross pin 22 removably fitted in openings in the beam. This pin 22 normally holds the shank in a vertical position against rearward movement and is preferably formed of wood or some other suitable material which will break under strain when the hoe strikes a stump or other obstruction, allowing the hoe to swing rearwardly and ride over said obstruction. After the obstruction has been passed, the operator may then insert a new pin 22 to again retain the hoe in working position. The hoes are arranged in transversely alined pairs on the respective beams at fixed intervals apart from front to rear, and by the diverging relation of the beams are disposed in staggered order, so as to operate upon the plants of two adjacent rows in the movement of the implement crosswise instead of longitudinally over the field. The hoes will accordingly act to thin out certain plants and leave others standing and will cast the loosened earth about the standing plants.

A ground or gage wheel 23 is provided in advance of the center of the implement and is mounted in a forked bracket 24 having a stem 25 extending upwardly through and journaled in a bore or opening 26 in a carrier bar 27 which carrier bar slides vertically in openings 28 and 29 in the bar 10 and forward end of the bracket plate 11, thus permitting the roller to be vertically adjusted. The wheel is adapted to freely turn in an obvious manner to follow the course of the machine and has the upper end of its bracket stem 25 extending into a slot 30 formed in the bar 27 and held in position by a washer 31 and a retaining key or pin 32 so as to allow it to freely rotate while permitting of its removal when occasion requires. By vertically adjusting the bar 27 the wheel may be arranged above or below the runners to regulate the depth of penetration of the hoes, as well as to tilt or lift the forward end of the implement to a determined degree to lighten and support it in the operation of turning the implement at the ends of rows. A lever 33 is provided for adjusting the roller and is pivotally connected at its forward end with the bar 27, as indicated at 34 and fulcrumed, as at 35, upon a short standard or support 36 carried by the bar 10 and projecting upwardly through a slot 37 in the bracket plate 11. The free end of the lever extends rearwardly a sufficient distance to enable it to be conveniently manipulated by the operator, and said lever is adapted by lateral movement to be engaged with a plurality of notches in the edge of the locking bar 38 extending upwardly from the bar 4 and reinforced by the brace 13, so as to secure said lever to hold the roller at different elevations.

The operation of the device will be readily understood from the foregoing description and its simplicity and advantages appreciated. An important feature of the invention resides in the use of the roller and its position upon the frame by which the front part of the implement may rest and its friction against the surface of the ground decreased in making turns at the ends of rows. In this operation the operator may lift the rear end of the frame by means of the handles 15, thus enabling the implement to be turned with ease and facility.

I claim:—

In a cotton chopper and cultivator comprising a frame provided with runners, handles at the rear of the frame, rearwardly diverging beams mounted upon the frame on opposite sides of the line of the handles, cultivating shovels carried by and depending from said beams, bracing means connecting the forward ends of the handles with each other and with the frame, said bracing means being provided with a guide opening, a device for elevating the forward end of the running frame supported by said bracing means and movable within said opening, an operating lever for said device extending rearwardly between the handles, and a locking means for said lever, including a locking element with which the lever is adapted to be engaged by a lateral movement.

In testimony whereof I affix my signature in presence of two witnesses.

MARIUS C. BURCH.

Witnesses:
SAML. BLACKWELL,
DAN WALDEN.